United States Patent
Schmitt et al.

(10) Patent No.: US 12,539,262 B2
(45) Date of Patent: Feb. 3, 2026

(54) METHOD FOR TREATING FRESHLY BLEACHED HAIR, COMPOSITION AND USE THEREOF

(71) Applicant: WELLA GERMANY GMBH, Darmstadt (DE)

(72) Inventors: Manfred Schmitt, Darmstadt (DE); Petra Braun, Darmstadt (DE); Rebecca Knobloch, Darmstadt (DE)

(73) Assignee: WELLA GERMANY GMBH, Darmstadt (DE)

( * ) Notice: Subject to any disclaimer, the term of this patent is extended or adjusted under 35 U.S.C. 154(b) by 0 days.

(21) Appl. No.: 18/538,126

(22) Filed: Dec. 13, 2023

(65) Prior Publication Data

US 2024/0299261 A1    Sep. 12, 2024

(30) Foreign Application Priority Data

Mar. 10, 2023  (EP) .................... 23161116

(51) Int. Cl.

| | |
|---|---|
| *A61Q 5/10* | (2006.01) |
| *A61K 8/22* | (2006.01) |
| *A61K 8/23* | (2006.01) |
| *A61K 8/24* | (2006.01) |
| *A61K 8/25* | (2006.01) |
| *A61K 8/34* | (2006.01) |
| *A61K 8/362* | (2006.01) |
| *A61Q 5/06* | (2006.01) |
| *A61Q 5/08* | (2006.01) |
| *A61Q 5/12* | (2006.01) |

(52) U.S. Cl.
CPC .................. *A61K 8/24* (2013.01); *A61K 8/22* (2013.01); *A61K 8/23* (2013.01); *A61K 8/25* (2013.01); *A61K 8/342* (2013.01); *A61K 8/362* (2013.01); *A61Q 5/065* (2013.01); *A61Q 5/08* (2013.01); *A61Q 5/12* (2013.01); *A61K 2800/4322* (2013.01)

(58) Field of Classification Search
CPC ... A61K 8/24; A61K 8/22; A61K 8/23; A61K 8/25; A61K 8/342; A61K 8/362; A61K 2800/4322; A61K 2800/20; A61K 8/411; A61Q 5/065; A61Q 5/08; A61Q 5/12; A61Q 5/10
USPC ................................. 8/405; 424/62
See application file for complete search history.

(56) References Cited

U.S. PATENT DOCUMENTS

| | | | |
|---|---|---|---|
| 5,888,484 A | 3/1999 | Schmitt et al. | |
| 5,989,530 A | 11/1999 | Lorenz et al. | |
| 2001/0029636 A1* | 10/2001 | Brownbill | A61K 8/22 8/405 |
| 2002/0029429 A1* | 3/2002 | Dias | A61K 8/22 8/405 |
| 2007/0169286 A1 | 7/2007 | Narasimhan et al. | |
| 2018/0193242 A1* | 7/2018 | Everaert | A61K 8/36 |

FOREIGN PATENT DOCUMENTS

| | | | | |
|---|---|---|---|---|
| EP | 0560088 A1 | 9/1993 | | |
| EP | 0778020 A1 | 6/1997 | | |
| EP | 0882444 A2 | 12/1998 | | |
| EP | 3597171 A1 * | 1/2020 | ............. | A61Q 5/10 |
| EP | 4005641 A1 * | 6/2022 | ............. | A61Q 5/10 |
| WO | WO 0172272 A2 * | 10/2001 | ............. | A61Q 5/08 |
| WO | WO 2020188001 A1 * | 9/2020 | ............. | A61Q 5/10 |
| WO | 2022112473 A1 | 6/2022 | | |

* cited by examiner

*Primary Examiner* — Eisa B Elhilo
(74) *Attorney, Agent, or Firm* — Dennemeyer & Associates LLC

(57) ABSTRACT

The present invention relates to a method for treating freshly bleached hair, a composition and use thereof.

19 Claims, No Drawings

METHOD FOR TREATING FRESHLY BLEACHED HAIR, COMPOSITION AND USE THEREOF

TECHNICAL FIELD

The present invention relates to a method for treating freshly bleached hair, a composition and use thereof.

BACKGROUND

The permanent alteration of the colour of keratinous fibers, in particular human hair, by the application of hair dyes is well known. In order to provide the consumer with the hair colour, a complex chemical process is sometimes utilized. Permanent hair dyeing formulations typically comprise oxidative hair dye precursors, which can diffuse into the hair through the cuticle and into the cortex where they can then react with each other and suitable oxidizing agents to form the end dye molecules. Due to the larger size of these resultant molecules they are unable to readily diffuse out of the hair during subsequent washing with water and/or detergents; hence delivering a consumer-desired permanency of colour.

A great variety of hair oxidative colouring compositions, providing the desired colour shade and the desired colour intensity, is now available for example hair colouring compositions having a pH from 6 to 12, preferably from 7 to 11.5. However, the user is often disappointed with the root-to-tip performance of these compositions. Indeed, especially on previously coloured hair, the significant lack of evenness (uniformity) of the colouration may be noticeable between the roots and the tips. Particularly, the tips may be darker than the roots of hair. In addition, these compositions may be aggressive to the hair and cause damages. In order to make composition milder to hair and scalp, its pH may be lowered to slightly alkaline or acidic ranges. However, uniformity issues may be even more pronounced manifesting in virtually no colour uptake on virgin hair and excessive colour uptake on previously damaged hair, e.g. almost uncoloured root hair and oversaturated tips. Another common issue of currently available milder compositions is the high variability in colour results from one user to another driven by difference in damage level, which makes final result unpredictable creating dissatisfaction to, both, stylists and final consumers.

A hair colouring composition having a pH from 6.8 to 8, obtained upon mixing a dye component having a pH from 8.5 to 10 and an oxidative component having a pH from 1.8 to 3.5 in a weight ratio from 3:1 to 1:3 is also known. The hair colouring composition has slightly alkaline pH which decreases to slightly acidic pH following its application on hair over development time. The hair colouring composition would provide a desired colour shade and intensity, without compromising the root-to-tip evenness. See for example the PCT application WO 2022/112473 A1 published on 2 Jun. 2022.

A hair colouring or bleaching composition having a pH of less than 9 and comprising a buffering system maintaining the pH between 6 and 8 is also known. The hair colouring composition would particularly provide resulting grey colour that fades within the grey colour space, with little to no appearance of brassy off-tone after colour fades. See for example the PCT application WO 2020/188001 A1 published on 24 Sep. 2020.

Besides providing satisfactory root-to-tip evenness on hair, the desired colour shade and the desired colour intensity as well as preserving natural strand-to-strand variation, there is a constant need for improving the users' experience, including the person in need of a hair treatment and the hairdresser. There is also the need for streamlining the hair treatment. There is also the need for facilitating obtaining coloured hair having satisfactory root-to-tip evenness on hair, desired colour shade, desired colour intensity and lowest damage potential.

SUMMARY

In one aspect, the present invention relates to a method for treating hair comprising the steps of:
  bleaching hair;
  applying a hair colouring composition onto hair, wherein the hair colouring composition has a pH from 7.0 to 8.0, preferably a pH of more than 7.2 up to 8.0, more preferably from 7.3 to 8.0, and comprises a buffering system;
  leaving the hair colouring composition for 10 minutes or less on hair, wherein the composition has a pH which over development time on hair drops by at least 0.20 unit to the range from 6.8 to 7.2; and
  rinsing out the hair colouring composition.

In some embodiments, the hair colouring composition is left on hair from 2 to 8 minutes, preferably from 3 to 7 minutes, more preferably from 4 to 6 minutes, most preferably for about 5 minutes.

In some embodiments, the hair is immediately bleached, preferably 48 h or less, preferably 24 h or less, more preferably 3 h or less, before applying the hair colouring composition.

In some embodiments, the hair colouring composition comprises at least one alkalizing agent, at least one oxidizing agent, at least one chelant, at least a first buffering acidic compound, at least a second buffering acidic compound, at least one buffering alkali compound, a gel network thickener system, at least one oxidative hair dye precursor and at least one coupler, and at least one solvent; wherein the gel network thickener system comprises at least one anionic surfactant, at least one fatty alcohol and at least one non-ionic surfactant.

In some embodiments, before applying the hair colouring composition onto hair, the method comprises the step of preparing the hair colouring composition by mixing a dye component and an oxidative component; wherein the dye component has a pH from 8.5 to 10, preferably from 9 to 10; and wherein the oxidative component has a pH from 1.8 to 3.5, preferably from 2 to 3.

In some embodiments, the dye component and the oxidative component are mixed in a weight ratio from 3:1 to 1:3, preferably from 2:1 to 1:2, more preferably of about 1:1.

In some embodiments, the dye component comprises at least one alkalizing agent, at least one chelant, at least one first buffering acidic compound, at least one anionic surfactant, at least one fatty alcohol, at least one non-ionic surfactant, at least one oxidative hair dye precursor and at least one coupler, and at least one solvent.

In some embodiments, the oxidative component comprises at least one oxidizing agent, at least one second buffering acidic compound, at least one buffering alkali compound, and at least one solvent.

In some embodiments, the first buffering acidic compound is citric acid, the second buffering acidic compound is phosphoric acid and the buffering alkali compound is disodium phosphate.

In some embodiments, after rinsing out the hair colouring composition, the method further comprises the step of drying hair, combing or brushing hair, and/or applying a conditioning composition onto hair.

In another aspect, the present invention relates to a composition for treating bleached hair, wherein the composition has a pH which over development time on hair drops by at least 0.20 unit to the range from 6.8 to 7.2; wherein the hair colouring composition comprises at least one alkalizing agent, at least one oxidizing agent, at least one chelant, at least a first buffering acidic compound, at least a second buffering acidic compound, at least one buffering alkali compound, a gel network thickener system, at least one oxidative hair dye precursor and at least one coupler, and at least one solvent; wherein the gel network thickener system comprises at least one anionic surfactant, at least one fatty alcohol and at least one non-ionic surfactant; wherein, the hair colouring composition onto hair is prepared by mixing a dye component and an oxidative component; wherein the dye component has a pH from 8.5 to 10, preferably from 9 to 10; and wherein the oxidative component has a pH from 1.8 to 3.5, preferably from 2 to 3.

In another aspect, the present invention relates to the use of the composition as described herein, for treating bleached hair.

DESCRIPTION

Definitions

As used herein the term "hair" to be treated may be "living" i.e., on a living body or may be "non-living" i.e., in a wig, hairpiece or other aggregation of non-living keratinous fibers. Mammalian, preferably human hair is preferred.

By "hair colouring composition" is meant a composition suitable for changing the colour of hair. The hair colouring composition is referred hereinafter as "the composition", unless otherwise specified. The hair colouring composition may comprise oxidative dye precursors, and/or direct dyes.

By "hair bleaching composition" is meant for example a composition suitable for lighting the hair for at least four levels of lifts, which may comprise ammonia, alkanolamines, sodium hydroxide and/or persulfates, percarbonates and perborates.

By "water-soluble" is means that in standard condition at least 0.1 g, 1 g, or 10 g of the oxidizing agent may be dissolved in 1 liter of deionized water.

By "substantially free of" is meant that a composition or a component comprises 0.1% or less, preferably 0.01% or less, more preferably about 0%, of a compound by weight per total weight of the composition or the component.

All percentages are weight by total weight (wt/wt) of the compositions, for example the hair colouring composition, the dye component or the oxidative component, respectively, unless otherwise specified. All ratios or percentages are weight ratios or weight percentages unless specifically stated otherwise.

The term "about", when used in relation to a weight ratio or a weight percentage, means that a specific value should be understood as meaning a range of +10%. For example, the weight proportion of a compound of about 1%, means a weight proportion ranging from 0.9 to 1.1%. For example, the weight proportion of a compound of about 2.5%, means a weight proportion ranging from 2.25 to 2.75%.

Method for Treating Freshly Bleached Hair

In a first aspect, the present invention relates to a method for treating freshly bleached hair.

The inventors have surprisingly showed that the method according to the invention is useful for treating freshly bleached hair. The method allows treating freshly bleached hair with a short development time, without impairing the desired colour shade, the desired intensity, and the root-to-tip evenness, and with a lowest damage potential. Indeed, the inventors unexpectedly showed that satisfactory results are obtained even though the hair colouring composition is left on hair only for a short period of time of 10 minutes or less, preferably from 2 to 8 minutes, more preferably from 3 to 7 minutes, even more preferably from 4 to 6 minutes, most preferably for about 5 minutes.

The method according to the present invention comprises the following steps:
bleaching hair;
applying a hair colouring composition onto hair, wherein the hair colouring composition has a pH from 7.0 to 8.0, preferably a pH of more than 7.2 up to 8.0, more preferably from 7.3 to 8.0, and comprises a buffering system;
leaving the hair colouring composition for 10 minutes or less on hair, wherein the composition has a pH which over development time on bleached hair drops by at least 0.20 unit to the range from 6.8 to 7.2; and
rinsing out the hair colouring composition.

Bleaching Step

The method comprises the step of bleaching hair. This step allows obtaining freshly bleached hair. By "freshly bleached hair" is meant bleached hair, which has been obtained 48 h or less before applying the hair colouring composition, and which has not been further washed, shampooed or treated, besides washing, shampooing or treating right after performing the bleaching treatment. Indeed, a bleaching treatment usually comprises at least one final step of washing, shampooing and/or conditioning, particularly for removing the hair bleaching composition from hair. Freshly bleached hair is therefore obtained immediately before applying the hair colouring composition.

Hair may be bleached, and therefore freshly bleached hair may be obtained, 48 h or less, preferably 24 h or less, more preferably 3 h or less, before applying the hair colouring composition.

The hair may be bleached using any suitable hair bleaching compositions, as described below.

After carrying out the bleaching step, and before applying the hair colouring composition, the method comprises the step of rinsing out the freshly bleached hair. This step allows obtaining rinsed bleached hair.

Hair may be rinsed using any suitable rinsing composition e.g., water or a shampoo composition.

After rinsing out the bleached hair, and before applying the hair colouring composition, the method may comprise the step of conditioning the freshly bleached hair.

After rinsing out the bleached hair, and before applying the hair colouring composition, the hair may be dried or left wet.

Hair Colouring Composition Application Step

The method comprises the step of applying a hair colouring composition onto freshly bleached hair, wherein the hair colouring composition has a pH from 7.0 to 8.0, preferably a pH of more than 7.2 up to 8.0, more preferably from 7.3 to 8.0, and comprises a buffering system. Upon application onto hair, the buffering system enables pH reduction from slightly alkaline to slightly acidic pH i.e., a pH reduction by at least 0.20 unit, preferably from 0.2 to 1 unit, more preferably from 0.2 to 0.5 unit, in the range from 6.8 to 7.2.

The hair colouring composition may be applied, and therefore coloured hair may be obtained, 48 h or less, preferably 24 h or less, more preferably 3 h or less, after bleaching hair.

A suitable hair colouring composition is described below.

A sufficient amount of the hair colouring composition (i.e., mixture) may be applied onto the hair, according to the hair abundance, for example from 30 to 250 grams, preferably from 40 to 150 grams, more preferably from 50 to 120 grams.

The hair colouring composition may be applied on hair via applicator bottle or brush or any alternative suitable device.

Development Step

The method comprises the step of leaving the hair colouring composition for 10 minutes or less, wherein the composition has a pH which over development time on bleached hair drops by at least 0.20 unit to the range from 6.80 to 7.20. This step allows obtaining coloured hair.

The hair colouring composition may be left from 2 to 8 minutes, preferably from 3 to 7 minutes, more preferably from 4 to 6 minutes, still more preferably for about 5 minutes, on hair.

Rinsing Step

The method comprises the step of rinsing out the hair colouring composition. This step allows obtaining rinsed coloured hair.

Hair may be rinsed using any suitable rinsing composition e.g., water or a shampoo composition.

Hair Provision Step

The hair bleaching composition may be applied on any suitable hair.

Hair may be any suitable hair, preferably human hair, including virgin (untreated) hair, previously coloured hair, previously bleached hair.

Hair Bleaching Composition Preparation Step

Prior application onto hair, the hair bleaching composition may be prepared by mixing at least a first component (alkalizing agent) and a second component (oxidizing agent) in a suitable weight ratio according to the application instructions.

The first component and the second component may be mixed in a weight ratio from 1:1 to 1:3, preferably about 1:2 for obtaining the hair bleaching composition.

A suitable first component and a suitable second component are described below.

In the retail market, hair bleaching compositions are usually sold as hair bleaching kits. The hair bleaching kits comprise at least two individually packaged components typically in at least two separate containers. The first component comprises a source of an alkalizing agent, preferably an ammonium ion source (e.g., ammonia, or monoethanolamine). The second component comprises an oxidizing agent, preferably hydrogen peroxide. The consumer mixes the two components together immediately before use and applies the mixture obtained onto hair.

The hair bleaching composition may be prepared immediately, preferably 30 minutes or less, more preferably 10 minutes or less, most preferably 5 minutes or less, before being applied onto hair.

Hair Colouring Composition Preparation Step

Prior application onto hair, the hair colouring composition may be prepared by mixing a dye component and an oxidative component.

The dye component and the oxidative component may be mixed in a weight ratio from 3:1 to 1:3, preferably from 2:1 to 1:2, more preferably of about 1:1.

A suitable dye component and a suitable oxidative component are described below.

In the retail market, hair colouring compositions are usually sold as hair colouring kits. The hair colouring kits at least comprise, in individually packaged components such as separate containers, a dye component (also called "dye cream" for emulsions or "dye liquid" for solutions) and an oxidative component (also called "hydrogen peroxide cream" for emulsions or "hydrogen peroxide liquid" for solutions). The consumer mixes the dye component and oxidative component together immediately before use and applies the mixture obtained onto hair.

In the professional hair salon market, the dye components and the oxidizing components are usually supplied independently to allow the professional to select a preferred combination.

The dye and the oxidative components may be provided in a variety of packaging devices and/or dispensing devices. These dispensing devices can come in the form of separate devices which may be used independently or in combination with one another. Typically, the dye and oxidative components are contained within separate single or multi-compartment containers so that they can be stored separately from one another before use. The components are then mixed together by a mixing means and the resulting mixture is then dispensed from the device and applied to the consumer's hair by an application means.

The most common packaging device which may be used involves storing the oxidative component in a container such as a bottle, tube, aerosol, or a sachet and separately storing the dye component in an additional compartment within the same container holding the oxidative component or preferably in a separate container which may be identical such as a dual sachet or aerosol systems for example or different such as a bottle and tube system. Any combination may be used and is typically contingent on the type of components being stored i.e., whether or not it is a thick or thin type.

The mixture of the dye component and the oxidative component may be worked until a uniform hair colouring composition is obtained. The user may mix the dye component and the oxidative component by any means. This may simply involve the use of a mixing bowl into which the components are dispensed and then mixed, preferably using a mixing means such as a tool. Alternatively, it may involve the addition of one of the components into the container of the other component (typically the dye component is added to the oxidative component), followed by manual shaking or mixing with a tool. Another system involves the perforation or displacement of a seal located between the separate compartments of the dye and oxidative components within a single container or sachet followed by manual mixing within the container or in a separate and/or additional container.

The devices described herein above can also be used in combination with a product delivery and or application tool to aid application of the product onto the hair. Again these devices may be of a very simple nature such as a nozzle attached to one of the containers or a separate applicator device such as a comb or brush. Such combs and brushes can be adapted in order to achieve particular effects, whether it may be quick and even coverage or root/hairline touch up, or highlights or streaks. Alternatively, the container or one of the containers may be provided with a comb attached to or instead of the dispensing nozzle whereby the product is dispensed through hollow tines and dispensing apertures located in the comb tines. The comb tines may be provided with single or multiple openings along the tines to improve product application and evenness especially root to tip. Product dispensation can be achieved by mechanical pressure applied to the container for example delaminating bottles or any of the mechanisms described hereinabove. The comb may be provided on the container such as to facilitate easy application and may be positioned vertically (so called verticomb) or at an angle to allow the consumer to access all areas. All devices may be designed to have inter-changeability, so that a range of different tools for hair application can be provided to the consumer.

The hair colouring composition may be prepared immediately, preferably 30 minutes or less, more preferably 10 minutes or less, most preferably 5 minutes or less, before being applied onto hair.

Drying Step

After rinsing out the hair colouring composition, the method may comprise the step of drying hair. Any suitable drying methods may be used. For example, hair may be dried using a towel, a blow-dryer or any alternative suitable devices.

Combing/Brushing Step

After rinsing out the hair colouring composition, the method may comprise the step of brushing or combing hair.

Conditioning Step

After rinsing out the hair colouring composition, the method may comprise the step of applying a conditioning composition onto hair.

Any suitable hair conditioning composition (different from the dye component and the oxidative component) may be applied. A hair conditioning composition may comprise a conditioning agent as described below.

Hair Bleaching Composition

The hair bleaching composition may be any conventional hair bleaching composition.

The hair bleaching composition corresponds to the ready-to-use composition i.e., to the composition ready to be applied onto hair. The hair colouring composition may be obtained upon mixing a first component (alkalizing agent), and a second component (oxidizing agent). The consumer mixes the two components together immediately before use and applies the mixture obtained onto hair.

The first component comprises a source of an alkalizing agent, preferably an ammonium ion source. The alkalizing agent may be an alkali salt and inorganic per-salt; preferably a persulfate salt, a percarbonate salt, a perborate salt, and mixtures thereof; more preferably a persulfate salt; most preferably ammonium persulfate, sodium persulfate, potassium persulfate, and mixtures thereof. The alkalizing agent may be present in an amount from 15 to 100% by weight per total weight of the first component. The first component may be a powder or a suspension.

The second component comprises an oxidizing agent, preferably hydrogen peroxide. The second component may comprise from 2 to 12% by weight of hydrogen peroxide per total weight of the second component, in an aqueous carrier, preferably water.

Any suitable hair bleaching compositions (and components thereof), for example commercially available products including Blondor MultiBlond may be used.

Hair Colouring Composition

The hair colouring composition corresponds to the ready-to-use composition i.e., to the composition ready to be applied onto hair. The hair colouring composition may be obtained upon mixing a dye component and an oxidative component. The dye component and the oxidative component may be mixed just before applying the hair colouring composition onto hair.

The hair colouring composition has a pH from 7.0 to 8, preferably a pH of more than 7.2 up to 8.0, more preferably from 7.3 to 8.0. The hair colouring composition also comprises a buffering system. After application onto hair, its pH drops by at least 0.2 unit to the range from 6.8 to 7.2 over a short development time i.e., for 10 minutes or less, preferably from 2 to 8 minutes, more preferably from 3 to 7 minutes, even more preferably from 4 to 6 minutes, most preferably for about 5 minutes, on hair. The pH of the composition can be determined by using either a Mettler Toledo MP220, MP225 or a Mettler Toledo Five Go (FG2) pH equipment, fitted with a standard laboratory pH electrode. The equipment is calibrated before each use using standard calibration buffers and using standard calibration procedure.

The hair colouring composition may comprise at least one alkalizing agent, at least one oxidizing agent, at least one chelant, at least a first buffering acidic compound, at least a second buffering acidic compound, at least one buffering alkali compound, a gel network thickener system, wherein the gel network thickener system comprises at least one anionic surfactant, at least one fatty alcohol and at least one non-ionic surfactant, at least one oxidative hair dye precursor and at least one coupler, and at least one solvent. The hair colouring composition may also comprise optionally at least one radical scavenger, optionally at least one conditioning agent, optionally at least one direct dye, optionally at least one thickener, optionally at least one antioxidant, optionally at least one non-thickening viscosity modifier, optionally at least one peroxide stabilizing agent, and/or optionally at least one additional surfactant (other than the at least one anionic surfactant present in the gel network thickening system).

Dye Component

The dye component has a pH from 8.5 to 10, preferably from 9 to 10.

The dye component may comprise at least one alkalizing agent, at least one chelant, at least one first buffering acidic compound, at least one anionic surfactant, at least one fatty alcohol, at least one non-ionic surfactant, at least one oxidative hair dye precursor and at least one coupler, at least one solvent. The dye component may also comprise optionally at least one radical scavenger, optionally at least one conditioning agent, optionally at least one direct dye, optionally at least one thickener, optionally at least one antioxidant, and/or optionally at least one non-thickening viscosity modifier.

Oxidative Component

The oxidative component has a pH from 1.8 to 3.5, preferably from 2 to 3.

The oxidative component may comprise at least one oxidizing agent, at least one second buffering acidic compound, at least one buffering alkali compound, at least one solvent. The oxidative component may also comprise optionally at least one chelant, optionally at least one conditioning agent, optionally at least one direct dye, optionally at least one thickener, optionally at least one peroxide stabilizing agent, and/or optionally at least one additional surfactant.

Alkalizing Agents

The dye component, and the hair colouring composition obtained thereof, may comprise at least one alkalizing agent.

Prior mixing, the at least one alkalizing agent may be present in the dye component in an amount from 0.2 to 4%, preferably from 0.2 to 2%, more preferably from 0.2 to 1%, even more preferably from 0.6 to 0.9%, by weight per total weight of the dye component.

The at least one alkalizing agent may be present in the hair colouring composition in an amount from 0.1 to 2%, preferably from 0.1 to 1%, more preferably from 0.1 to 0.5%, even preferably from 0.3 to 0.45%, by weight per total weight of the hair colouring composition.

The at least one alkalizing agents may be chosen from ammonia, alkanolamines (such as monoethanolamine, diethanolamine, triethanolamine, monopropanolamine, dipropanolamine, tripropanolamine 2-amino-2-methyl-1,3-propanediol, 2-amino-1-propanol, 3-amino-1-propanol, 2-amino-2-methyl-1-propanol, and 2-amino-2-hydroxymethyl-1,3-propanediol), dimethylglucamine, guanidium salts, alkali metal and ammonium hydroxides (such as sodium hydroxide), alkali metal and ammonium carbonates, and mixtures thereof; preferably from ammonia, monoethanolamine, sodium hydroxide, and mixtures thereof; preferably the alkalizing agent is a mixture of monoethanolamine and sodium hydroxide.

In the present context, the at least one alkalizing agents (e.g. ammonia, monoethanolamine and their derivatives thereof) are solely classified as "alkalizing agents".

Oxidizing Agents

The oxidative component, and the hair colouring composition obtained thereof, may comprise at least one oxidizing agent.

Prior mixing, the at least one oxidizing agent may be present in the oxidative component in an amount from 1 to 3%, preferably from 1.2 to 2.4%, more preferably from 1.5 to 2%, by weight per total weight of the oxidative component.

The at least one oxidizing agent may be present in the hair colouring composition in an amount from 0.5 to 1.5%, preferably from 0.6 to 1.2%, preferably about 0.75 to 1%, by weight per total weight of the oxidative component.

The at least one oxidizing agent may be water-soluble inorganic peroxygen materials capable of yielding hydrogen peroxide in an aqueous solution; preferably the oxidizing agents may be chosen from hydrogen peroxide, inorganic alkali metal peroxides (such as sodium periodate and sodium peroxide), organic peroxides (such as urea peroxide, melamine peroxide), inorganic perhydrate salt bleaching compounds (such as the alkali metal salts of perborates, percarbonates, perphosphates, persilicates, persulphates), and mixtures thereof; preferably from hydrogen peroxide, persulphates, and mixtures thereof; preferably the oxidizing agent is hydrogen peroxide.

The at least one oxidizing agent may be provided in aqueous solution or as a powder which is dissolved prior to use.

Chelants

The dye component and optionally the oxidative component, and the hair colouring composition obtained thereof, may comprise at least one chelant. When chelants are present both in the dye component and in the oxidative component, the at least one chelant present in the dye component may be referred as the "at least one first chelant" and the at least one chelant present in the oxidative component may be referred as the "at least one second chelant". The first and second chelants respectively present in the dye component and the oxidative component may be the same compounds or may be different compounds.

Prior mixing, the at least one (first) chelant may be present in the dye component in an amount from 1.2 to 1.8%, preferably from 1.2 to 1.6%, by weight per total weight of the dye component.

Prior mixing, if present, the at least one (second) chelant may be present in the oxidative component in an amount of 0.1% or less, preferably from 0.001 to 0.05%, by weight by weight per total weight of the oxidative component.

The at least one chelant may be present in the hair colouring composition in an amount from 0.6 to 0.9%, preferably from 0.6 to 0.8%, by weight per total weight of the hair colouring composition.

The at least one chelant may be chosen from carboxylic acids (such as aminocarboxylic acids), phosphonic acids (such as aminophosphonic acids), polyphosphoric acids (such as linear polyphosphoric acids), their salts thereof, and mixtures thereof; preferably from aminocarboxylic acids, aminophosphonic acids, linear polyphosphoric acids, their salts thereof, and mixtures thereof; preferably from aminocarboxylic acids.

Aminocarboxylic acid chelants may be chosen from diethylenetriamine pentaacetic acid (DTPA), ethylenediamine disuccinic acid (EDDS), ethylenediamine diglutaric acid (EDGA), 2-hydroxypropylenediamine disuccinic acid (HPDS), glycinamide-N,N'-disuccinic acid (GADS), ethylenediamine-N—N'-diglutaric acid (EDDG), 2-hydroxypropylenediamine-N—N'-disuccinic acid (HPDDS), ethylenediaminetetraacetic acid (EDTA), ethylenedicysteic acid (EDC), ethylenediamine-N—N'-bis(ortho-hydroxyphenyl acetic acid) (EDDHA), diaminoalkyldi(sulfosuccinic acids) (DDS), N,N'-bis(2-hydroxybenzyl)ethylenediamine-N,N'-diacetic acid (HBED), their salts thereof, and mixtures thereof; preferably from the group consisting of EDDS, EDTA, their salts thereof, and mixtures thereof.

Aminophosphonic acids may be chosen from aminotri-(methylenephosphonic acid), aminotri-(1-ethylphosphonic acid), aminotri-(isopropylphosphonic acid), ethylene-diamine tetra-(1-ethylphosphonic acid), aminotri-(1-propylphosphonic acid), ethylene-diamine-tetra-(methylenephosphonic acid) (EDTMP), diethylene-triamine-penta-(methylenephosphonic acid) (DTPMP), their salts thereof, and mixtures thereof.

The at least one (first) chelant, present in the dye component, may be chosen from carboxylic acids, phosphonic acids, polyphosphoric acids, their salts thereof, and mixtures thereof; preferably from aminocarboxylic acids; preferably from DTPA, EDDS, EDGA, HPDS, GADS, EDDG, HPDDS, EDTA, EDC, EDDHA, DDS, HBED, their salts thereof, and mixtures thereof; preferably from EDDS, EDTA, their salts thereof, and mixtures thereof; preferably the at least one (first) chelant is a mixture of EDDS and EDTA.

If present, the at least one (second) chelant, present in the oxidative component, may be etidronic acid.

Buffering System

The composition comprises a buffering system, which enables pH reduction from slightly alkaline to slightly acidic pH. A buffering system is obtained when combining at least one buffering acidic compound and at least one buffering alkali compound.

The dye component, and the hair colouring composition obtained thereof, may comprise at least one first buffering acidic compound.

Prior mixing, the at least one first buffering acidic compound may be present in the dye component in an amount from 0.01 to 0.6%, preferably from 0.05 to 0.45%, more preferably from 0.15 to 0.45%, by weight per total weight of the dye component.

The at least one first buffering acidic compound may be present in the hair colouring composition in an amount from 0.05 to 0.3%, preferably from 0.025 to 0.225%, preferably from 0.075 to 0.225%, by weight per total weight of the hair colouring composition.

The oxidative component, and the hair colouring composition obtained thereof, may comprise at least one second buffering acidic compound.

Prior mixing, the at least one second buffering acidic compound may be present in the oxidative component in an amount from 0.15 to 0.5%, preferably from 0.17 to 0.4%, more preferably from 0.17 to 0.3%, by weight per total weight of the oxidative component.

The at least one second buffering acidic compound may be present in the hair colouring composition in an amount from 0.075 to 0.25%, preferably from 0.085 to 0.2%, preferably from 0.085 to 0.15%, by weight per total weight of the hair colouring composition.

Buffering acidic compounds may be chosen from organic and inorganic acids; preferably from sulphurous acid, sulphuric acid, hydrochloric acid, hyponitrous acid, nitrous acid, nitric acid, phosphoric acid, phosphorous acid, citric acid, malic acid, and mixtures thereof; preferably from phosphoric acid, phosphorous acid, citric acid, malic acid, hydrochloric acid, hyponitrous acid, and their mixtures; preferably from phosphoric acid, citric acid, and mixtures thereof.

The oxidative component, and the hair colouring composition obtained thereof, may comprise at least one alkali buffering component.

Prior mixing, the at least one alkali buffering component may be present in the oxidative component in an amount from 0.2 to 0.6%, preferably from 0.2 to 0.5%, more preferably from 0.2 to 0.35%, by weight per total weight of the oxidative component.

The at least one alkali buffering compound may be present in the hair colouring composition in an amount from 0.1 to 0.3%, preferably from 0.1 to 0.25%, preferably from 0.1 to 0.175%, by weight per total weight of the alkali buffering compound.

The buffering alkali compound may be chosen from alkali metal salts, amino acids, salts thereof, and mixtures thereof; preferably from glycine, alkali metal salts, amino acids, chlorides, nitrates, salts thereof, and mixtures thereof; preferably from alkali metal of chlorides, nitrates and/or phosphoric acid, glycine, salts thereof, and mixtures thereof; preferably from alkali metal of phosphoric acid, salts thereof, and mixtures thereof; preferably the buffering alkali compound is disodium phosphate. In the present context, the alkalizing agents (e.g. ammonia, monoethanolamine, sodium hydroxide, and their derivatives thereof) are not classified as "buffering alkali compounds". The expression "buffering alkali compound" therefore presently excludes e.g. ammonia, monoethanolamine, sodium hydroxide and their derivatives thereof.

In one embodiment, the first buffering acidic compound is citric acid, the second buffering acidic compound is phosphoric acid and the buffering alkali compound is disodium phosphate. In this embodiment, the hair colouring composition comprises a buffering system comprising phosphoric acid (buffering acidic compound), citric acid (buffering acidic compound), and disodium phosphate (buffering alkali compound).

Gel Network Thickener

The hair colouring composition may comprise a gel network thickener system, which is defined as a thickening system comprising a tertiary system. This system comprises at least one anionic surfactant, at least one fatty alcohol and at least one non-ionic surfactant.

The gel network thickener system may be present in the hair colouring composition in an amount from 1.2 to 4.5%, preferably from 2 to 4%, by weight per total weight of the hair colouring composition.

The dye component, and the hair colouring composition obtained thereof, comprises at least one anionic surfactant.

Prior mixing, the at least one anionic surfactant may be present in the dye component in an amount from 0.2 to 1%, preferably from 0.5 to 0.8%, more preferably from 0.5 to 0.65%, by weight per total weight of the dye component.

The at least one anionic surfactant may be present in the dye component in an amount from 0.1 to 0.5%, preferably from 0.25 to 0.4%, more preferably from 0.25 to 0.325%, by weight per total weight of the dye component.

The at least one anionic surfactants may be chosen from C14 to C30 alkyl phosphates, C14 to C30 alkyl ether phosphates, and mixtures thereof; preferably from C14 to C18 alkyl phosphates, C14-C18 alkyl ether phosphates, and mixtures thereof; preferably the anionic surfactant is a mixture of dicetyl phosphate and ceteth-10 phosphate. Preferably, the alkyl ether phosphates have an average of from 1 to 20 and preferably from 1 to 10 ethylene oxide units.

The dye component and/or the oxidative component, and the hair colouring composition obtained thereof, comprise at least one fatty alcohol. In one embodiment, the fatty alcohol is only present in the dye component. In an alternative embodiment, the fatty alcohol is present in the dye component and in the oxidative component.

Prior mixing, the at least one fatty alcohol may be present in the dye component in an amount from 1.6 to 2.5%, preferably from 1.6 to 2.3%, more preferably from 1.65 to 2.1%, by weight per total weight of the dye component.

Prior mixing, if present, the at least one fatty alcohol may be present in the oxidative component in an amount from 1.6 to 3.4%, preferably from 1.8 to 3.2%, preferably from 2 to 3% of a fatty alcohol, by weight per total weight of the oxidative component.

The at least one fatty alcohol may be present in the hair colouring composition in an amount from 0.8 to 1.25%, preferably from 0.8 to 1.15%, more preferably from 0.825 to 1.05%, by weight per total weight of the hair colouring composition. Alternatively, the at least one fatty alcohol may be present in the hair colouring in an amount from 1.6 to 2.95%, preferably from 1.7 to 2.75%, more preferably from 1.825 to 2.55%, by weight per total weight of the hair colouring composition.

The fatty alcohol may be chosen from a linear or branched C14 to C30 fatty alcohol, and mixtures thereof; preferably from cetyl alcohol, stearyl alcohol, cetostearyl alcohol, cetearyl alcohol, behenyl alcohols, and mixtures thereof; preferably cetearyl alcohol.

The dye component, and the hair colouring composition thereof, may comprise at least one non-ionic surfactant.

Prior mixing, the at least one non-ionic surfactant may be present in the dye component in an amount from 0.1 to 0.5%, preferably from 0.2 to 0.3%, by weight per total weight of the dye component.

The at least one non-ionic surfactant may be present in the hair colouring component in an amount from 0.05 to 0.25%, preferably from 0.1 to 0.15%, by weight per total weight of the composition.

The non-ionic surfactant may be chosen from polyoxyethylene C14 to C30 alkyl ethers; preferably from polyoxyethylene C14 to C30 alkyl ethers, comprising one or more polyethyleneoxide chains having at least 50, or from 50 to 200, or from 100 to 200 ethylene oxide units; preferably from steareth-20, steareth-100, steareth-150, steareth-200, and mixtures thereof; preferably steareth-200.

Hair Dyes

The dye component, and the hair colouring composition thereof, may comprise at least one oxidative hair dye precursor (also known as "primary intermediate", "primary dye" or "dyes intermediate") and at least one coupler (also known as "colour modifier" or "secondary intermediate"). The choice of precursors and couplers will be determined by the colour, shade and intensity of colouration that is desired. The hair dye precursors and couplers can be used herein, singly or in combination, to provide dyes having a variety of shades ranging from ash blonde to black.

Prior mixing, the at least one oxidative hair dye precursor and the at least one coupler may be present altogether in the dye component in an amount of 20% or less, preferably from 0.002 to 20%, more preferably from 0.002 to 10%, still more preferably from 0.2 to 4%, even more preferably from 0.4 to 2%, by weight per total weight of dye component.

The at least one oxidative hair dye precursor and the at least one coupler may be present altogether in the hair colouring composition in an amount of 10% or less, preferably from 0.001 to 10%, more preferably from 0.001 to 5%, still more preferably from 0.1 to 2%, even more preferably from 0.2 to 1%, by weight per total weight of hair colouring composition.

The primary intermediates may be chosen from toluene-2,5-diamine, p-phenylenediamine, N-phenyl-p-phenylenediamine, N,N-bis(2-hydroxyethyl)-p-phenylenediamine, 2-hydroxyethyl-p-phenylenediamine, hydroxypropyl-bis-(N-hydroxyethyl-p-phenylenediamine), 2-methoxymethyl-p-phenylenediamine, 2-(1,2-dihydroxyethyl)-p-phenylenediamine, 2,2'-(2-(4-aminophenylamino)ethylazanediyl) diethanol, 2-(2,5-diamino-4-methoxyphenyl)propane-1,3-diol, 2-(7-amino-2H-benzo[b][1,4]oxazin-4(3H)-yl)ethanol, 2-chloro-p-phenylenediamine, p-aminophenol, p-(methylamino)phenol, 4-amino-m-cresol, 6-amino-m-cresol, 5-ethyl-o-aminophenol, 2-methoxy-p-phenylenediamine, 2,2'-methylenebis-4-aminophenol, 2,4,5,6-tetraminopyrimidine, 2,5,6-triamino-4-pyrimidinol, 1-hydroxyethyl-4,5-diaminopyrazole sulfate, 4,5-diamino-1-methylpyrazole, 4,5-diamino-1-ethylpyrazole, 4,5-diamino-1-isopropylpyrazole, 4,5-diamino-1-butylpyrazole, 4,5-diamino-1-pentylpyrazole, 4,5-diamino-1-benzylpyrazole, 2,3-diamino-6,7-dihydropyrazolo[1,2-a]pyrazol-1(5H)-one dimethosulfonate, 4,5-diamino-1-hexylpyrazole, 4,5-diamino-1-heptylpyrazole, methoxymethyl-1,4-diaminobenzene, N,N-bis(2-hydroxyethyl)-N-(4-aminophenyl)-1,2-diaminothane, 2-[(3-aminopyrazolo[1,5-a]pyridin-2-yl)oxy]ethanol hydrochloride, salts thereof, and mixtures thereof.

The couplers may be chosen from resorcinol, 4-chlororesorcinol, 2-chlororesorcinol, 2-methylresorcinol, 4,6-dichlorobenzene-1,3-diol, 2,4-dimethylbenzene-1,3-diol, m-aminophenol, 4-amino-2-hydroxytoluene, 2-methyl-5-hydroxyethylaminophenol, 3-amino-2,6-dimethylphenol, 3-amino-2,4-dichlorophenol, 5-amino-6-chloro-o-cresol, 5-amino-4-chloro-o-cresol, 6-hydroxybenzomorpholine, 2-amino-5-ethylphenol, 2-amino-5-phenylphenol, 2-amino-5-methylphenol, 2-amino-6-methylphenol, 2-amino-5-ethoxyphenol, 5-methyl-2-(methylamino)phenol, 2,4-diaminophenoxyethanol, 2-amino-4-hydroxyethylaminoanisole, 1,3-bis-(2,4-diaminophenoxy)propane, 2,2'-(2-methyl-1,3-phenylene)bis(azanediyl) diethanol, benzene-1,3-diamine, 2,2'-(4,6-diamino-1,3-phenylene)bis(oxy)diethanol, 3-(pyrrolidin-1-yl)aniline, 1-(3-(dimethylamino)phenyl)urea, 1-(3-aminophenyl)urea, 1-naphthol, 2-methyl-1-naphthol, 1,5-naphthalenediol, 2,7-naphthalenediol or 1-acetoxy-2-methylnaphthalene, 4-chloro-2-methylnaphthalen-1-ol, 4-methoxy-2-methylnaphthalen-1-ol, 2,6-dihydroxy-3,4-dimethylpyridine, 2,6-dimethoxy-3,5-pyridinediamine, 3-amino-2-methylamino-6-methoxypyridine, 2-amino-3-hydroxypyridine, 2,6-diaminopyridine, pyridine-2,6-diol, 5,6-dihydroxyindole, 6-hydroxyindole, 5,6-dihydroxyindoline, 3-methyl-1-phenyl-1H-pyrazol-5(4H)-one, 1,2,4-trihydroxybenzene, 2-(benzo[d][1,3]dioxol-5-ylamino)ethanol (also known as hydroxyethyl-3,4-methylenedioxyaniline), and mixtures thereof.

The oxidative hair dye precursor may be chosen from p-aminophenol, N,N-bis(2-hydroxyethyl)-p-phenylenediamine, 3-methyl-p-aminophenol, methoxymethyl-1,4-diaminobenzene, 2,5-toluenediamine sulfate, and mixtures thereof; and the coupler may be chosen from resorcinol, 4-amino-2-hydroxytoluene, 2-methylresorcinol, hydroxyethyl-3,4-methylenedioxyaniline, and mixtures thereof.

Solvents

The dye component, the oxidative component, and the hair colouring composition obtained thereof, may comprise at least one solvent.

Prior mixing, the at least one solvent may be present in the dye component in an amount of at least 50%, preferably of at least 60%, preferably of at least 70%, by weight per total weight of the dye component.

Prior mixing, the at least one solvent may be present in the oxidative component in an amount of at least 50%, preferably of at least 60%, preferably of at least 70%, by weight per total weight of the oxidative component.

The at least one solvent may be present in the hair colouring composition in an amount of at least 50%, preferably of at least 60%, preferably of at least 70%, by weight per total weight of the hair colouring composition.

The solvent may be selected from water, or a mixture of water and at least one organic solvent to dissolve the compounds that would not typically be sufficiently soluble in water. The organic solvents may be chosen from C1 to C4 lower alkanols (such as ethanol, propanol, isopropanol), aromatic alcohols (such as benzyl alcohol and phenoxyethanol), polyols and polyol ethers (such as carbitols, 2-butoxyethanol, propylene glycol, propylene glycol monomethyl ether, diethylene glycol monoethyl ether, monomethyl ether, hexylene glycol, glycerol, ethoxy glycol, butoxydiglycol, ethoxydiglycerol, dipropyleneglocol, polygylcerol), propylene carbonate, and mixtures thereof; preferably from the group consisting of ethanol, propanol, isopropanol, glycerol, 1,2-propylene glycol, hexylene glycol, ethoxy diglycol, and mixtures thereof; preferably the organic solvent is propylene glycol.

In one embodiment, the dye component comprises a solvent comprises water and propylene glycol.

In one embodiment, the oxidative component comprises a solvent being water.

Radical Scavenger

The dye component, and the hair colouring composition obtained thereof, may comprise at least one radical scavenger.

The at least one scavenger may be present in the hair colouring composition in an amount from 0.01 to 0.5%, preferably from 0.01 to 0.2%, preferably of about 0.15% %, by weight per total weight of the hair colouring composition.

Prior mixing, the at least one scavenger may be present in the dye component in an amount from an amount of 1% or less, preferably from 0.02 to 1%, preferably from 0.02 to 0.4%, preferably of about 0.3%, by weight per total weight of the dye component.

Radical scavengers help to reduce damage to the hair during an oxidative process.

The radical scavengers may be chosen from alkanolamines, amino sugars, amino acids, esters of amino acids, and mixtures thereof; preferably from 3-amino-1-propanol, 4-amino-1-butanol, 5-amino-1-pentanol, 1-amino-2-propanol, 1-amino-2-butanol, 1-amino-2-pentanol, 1-amino-3-pentanol, 1-amino-4-pentanol, 3-amino-2-methylpropan-1-ol, 1-amino-2-methylpropan-2-ol, 3-aminopropane-1,2-diol, glucosamine, N-acetylglucosamine, glycine, arginine, lysine, proline, glutamine, histidine, sarcosine, serine, glutamic acid, tryptophan, their salts thereof, and mixtures thereof; preferably from glycine, sarcosine, lysine, serine, 2 methoxyethylamine, glucosamine, glutamic acid, morpholine, piperdine, ethylamine, 3 amino-1-propanol, and mixtures thereof. As used herein, the term "salts thereof"—in the context of radical scavengers-means particularly potassium salts, sodium salts, ammonium salts, and mixtures thereof.

Conditioning Agent

The dye component and/or the oxidative component and/or a third component, and the hair colouring composition obtained thereof, may comprise at least one conditioning agent. The hair conditioning composition, if applied, may also comprise at least one conditioning agent.

Prior mixing, the conditioning agent may be present in the dye component, the oxidative component or a third component, preferably the oxidative component.

Prior mixing, the conditioning agent may be present in the oxidative component in an amount from 0.1 to 40%, preferably from 0.2 to 30%, more preferably from 0.4 to 20%, still more preferably from 0.4% to 10%, even more preferably about 3.3%, by weight per total weight of the oxidative component.

The at least one conditioning agent may be present in the hair colouring composition in an amount from 0.05 to 20%, preferably from 0.1 to 15%, more preferably from 0.2 to 10%, still more preferably from 0.2% to 5%, by weight per total weight of the hair colouring composition.

The conditioning agents may be chosen from polyhydric alcohol, silicone materials, amino silicones, fatty alcohols, polymeric resins, polyol carboxylic acid esters, cationic polymers, cationic surfactants, insoluble oils, oil-derived materials, mineral oil, and mixtures thereof; preferably the conditioning agent is mineral oil.

Direct Dyes

The dye component and/or the oxidative component, and the hair colouring composition obtained thereof, may comprise at least one direct dye.

The at least one direct dye may be present in the hair colouring composition in an amount from 0.05% to 4%, by weight per total weight of the composition.

Prior mixing, when the oxidative component is free of at least one direct dye, the at least one direct dye may be present in the dye component in an amount from 0.05 to 4%, by weight of total weight of the dye component.

Prior mixing, when the dye component is substantially free of at least one direct dye, the at least one direct dye may be present in the oxidative component in an amount from 0.05 to 4%, by weight of total weight of the oxidative component.

Alternatively, prior mixing, the at least one direct dye may be present in the oxidative component in an amount from 0.05 to 4%, by weight of total weight of the oxidative component as well as it may be present in the dye component in an amount from 0.05 to 4%, by weight of total weight of the dye component.

Thickeners

The dye component and/or the oxidative component, and the hair colouring composition obtained thereof, may comprise at least one thickener.

The at least one thickener may be present in the hair colouring composition in an amount from 0.05% to 1.0%, by weight per total weight of the hair colouring composition.

Prior mixing, the at least one thickener may be present in the dye component in an amount from 0.1% to 2.0%, preferably about 0.15%, by weight per total weight of the dye component.

Prior mixing, the thickener may be present in the oxidative component in an amount from 0.001% to 0.1%, by weight total weight of the oxidative component.

The thickeners may be chosen from associative polymers, polysaccharides, non-associative polycarboxylic polymers, and mixtures thereof.

In one embodiment, the dye component comprises at least one polysaccharide.

In one embodiment, the oxidative component comprises at least one associative polymer.

As used herein, the expression "associative polymers" means amphiphilic polymers comprising both hydrophilic units and hydrophobic units, for example, at least one C8 to C30 fatty chain and at least one hydrophilic unit. Associative polymers are capable of reversibly combining with each other or with other molecules. Suitable associative thickeners include, but are not limited to: nonionic amphiphilic polymers comprising at least one hydrophilic unit and at least one fatty-chain unit; anionic amphiphilic polymers comprising at least one hydrophilic unit and at least one fatty-chain unit; cationic amphiphilic polymers comprising at least one hydrophilic unit and at least one fatty-chain unit; and amphoteric amphiphilic polymers comprising at least one hydrophilic unit and at least one fatty-chain unit, and mixtures thereof.

Suitable nonionic amphiphilic polymers comprising at least one fatty chain and at least one hydrophilic unit include, but are not limited to: celluloses modified with groups comprising at least one fatty chain (such as hydroxyethylcelluloses modified with groups comprising at least one fatty chain chosen from alkyl, alkenyl and alkylaryl groups); hydroxypropyl guars modified with groups comprising at least one fatty chain; polyether urethanes comprising at least one fatty chain (such as C8-C30 alkyl or alkenyl groups); copolymers of vinylpyrrolidone and of fatty-chain hydrophobic monomers; copolymers of C1-C6 alkyl acrylates or methacrylates and of amphiphilic monomers comprising at least one fatty chain; copolymers of hydrophilic acrylates or methacrylates and of hydrophobic monomers comprising at least one fatty chain, and mixtures thereof.

Suitable nonionic amphiphilic polymers comprising at least one hydrophilic unit and at least one fatty-chain unit include, but are not limited to: those polymers comprising at least one fatty-chain allyl ether unit and at least one hydrophilic unit comprising an ethylenic unsaturated anionic monomeric unit (such as a vinylcarboxylic acid unit, particularly a unit chosen from units derived from acrylic acids, methacrylic acids, and mixtures thereof), wherein the fatty-chain allyl ether unit corresponds to the monomer of formula (I) below $$CH_2=C(R_1)CH_2OB_nR \qquad (I)$$

in which $R_1$ is chosen from H and $CH_3$, B is an ethyleneoxy radical, n is chosen from zero and integers ranging from 1 to 100, R is chosen from hydrocarbon-based radicals chosen from alkyl, alkenyl, arylalkyl, aryl, alkylaryl and cycloalkyl radicals, comprising from 8 to 30 carbon atoms, and, further, for example, from 10 to 24 carbon atoms and even further, for example, from 12 to 18 carbon atoms.

Suitable anionic amphiphilic polymers include, but are not limited to: those polymers comprising at least one hydrophilic unit of unsaturated olefinic carboxylic acid type, and at least one hydrophobic unit of the type such as a (C8-C30) alkyl ester or (C8-C30) oxyethylenated alkyl ester of an unsaturated carboxylic acid, wherein the hydrophilic unit of unsaturated olefinic carboxylic acid type corresponds to, for example, the monomer of formula (II) below

in which $R_2$ is chosen from H, $CH_3$, $C_2H_5$ and $CH_2COOH$ (i.e. acrylic acid, methacrylic, ethacrylic and itaconic acid units); and wherein the hydrophobic unit of the type such as a (C8-C30) alkyl ester or (C8-C30) oxyethylenated alkyl ester of an unsaturated carboxylic acid corresponds to, for example, the monomer of formula (III) below

in which $R_3$ is chosen from H, CH3, C2H5 and CH2COOH (i.e. acrylate, methacrylate, ethacrylate and itaconate units), B is an ethyleneoxy radical, n is chosen from zero and integers ranging from 1 to 100, $R_4$ is chosen from C8-C30 alkyl radicals, for example, C12-C22 alkyl radical.

Anionic amphiphilic polymers may further be cross-linked. The crosslinking agent can be a monomer comprising a group (IV) below:

with at least one other polymerizable group whose unsaturated bonds are not conjugated with respect to one another. Mention may be made, for example, of polyallyl ethers such as polyallylsucrose and polyallyl pentaerythritol.

Suitable cationic amphiphilic polymers include, but are not limited to: quaternized cellulose derivatives and polyacrylates comprising amino side groups. The quaternized cellulose derivatives are, for example, chosen from quaternized celluloses modified with groups comprising at least one fatty chain, such as alkyl, arylalkyl and alkylaryl groups comprising at least 8 carbon atoms, and mixtures thereof, quaternized hydroxyethylcelluloses modified with groups comprising at least one fatty chain, such as alkyl, arylalkyl and alkylaryl groups comprising at least 8 carbon atoms, and mixtures thereof. The alkyl radicals borne by the above quaternized celluloses and hydroxyethylcelluloses, for example, contain from 8 to 30 carbon atoms. The aryl radicals, for example, are chosen from phenyl, benzyl, naphthyl and anthryl groups.

Suitable amphoteric amphiphilic polymers comprising at least one hydrophilic unit and at least one fatty-chain unit, may be made, for example, of methacrylamidopropyltrimethylammonium chloride/acrylic acid/C8-C30 alkyl methacrylate copolymers, wherein the alkyl radical is, for example, a stearyl radical.

Preferred associative polymers comprise at least one hydrophilic unit which is unsaturated carboxylic acid or its derivatives, and at least one hydrophobic unit which is a C8 to C30 alkyl ester or oxyethylenated C8-C30 alkyl ester of unsaturated carboxylic acid. The unsaturated carboxylic acid is preferably acrylic acid, methacrylic acid or itaconic acid. Commercially available materials include those sold as Aculy-22 by Rohm & Haas; Permulen TR1, Carbopol 2020, Carbopol Ultrez-21 by Noveon, Structure 2001/3001 by National Starch. Other preferred associative polymers include polyether polyurethane, commercially available as Aculyn-44/-46 by Rohm and Haas. Further preferred associative polymers include cellulose modified with groups comprising at least one C8-C30 fatty chain, commercially available under the trade name Natrosol Plus Grade 330 CS by Aqualon.

Suitable non-associative cross-linked polycarboxylic polymers include, but are not limited to: cross-linked acrylic acid homopolymers, copolymers of acrylic or (meth)acrylic acid and of C1-C6 alkyl acrylate or (meth)acrylate, and mixtures thereof. Commercially available materials include those sold as Carbopol 980/981/954/2984/5984 by Noveon, Synthalen M/Synthalen L/Synthalen K by 3V Sigma, Acu-lyn-33 by Rohm and Haas.

The polysaccharides may be chosen from glucans, modified and unmodified starches, amylose, amylopectin, glycogen, dextrans, celluloses and derivatives thereof, mannans, xylans, lignins, arabans, galactans, galacturonans, chitin, chitosans, glucuronoxylans, arabinoxylans, xyloglucans, glucomannans, pectic acids and pectins, alginic acid and alginates, arabinogalactans, carrageenans, agars, glycosaminoglucans, gum arabics, gum tragacanths, ghatti gums, karaya gums, carob gums, galactomannans, xanthan gums, gellan gums, welan gums, scleroglucans, succinoglycans, and mixtures thereof; preferably from the group consisting of xanthan gum, gellan gum, welan gum, scleroglucan or succinoglycan, and mixtures thereof; preferably from the group consisting of xanthan gum, succinogylcan, and mixtures thereof; preferably the polysaccharide is xanthan gum.

Antioxidants

The dye component, and the hair colouring composition obtained thereof, may comprise at least one antioxidant.

The at least one antioxidant may be present in the hair colouring composition in an amount from 0.0.5 to 1%, preferably from 0.25 to 0.75%, by weight per total weight of the hair colouring composition.

Prior mixing, the at least one antioxidant may be present in the dye component in an amount from 0.1 to 2%, preferably from 0.5 to 1.5%, by weight per total weight of the dye component.

The antioxidant may be chosen from ascorbic acid, sodium sulfite, and mixture thereof; preferably the antioxidant is a mixture of ascorbic acid and sodium sulfite.

Non-Thickening Viscosity Modifiers

The dye component, and the hair colouring composition obtained thereof, may comprise at least one non-thickening viscosity modifier.

The at least one non-thickening viscosity modifier may be present in the hair colouring composition in an amount from 0.25 to 0.75%, preferably from 0.35 to 0.65%, by weight per total weight of the hair colouring composition.

Prior mixing, the at least one non-thickening viscosity modifier may be present in the dye component in an amount from 0.5 to 1.5%, preferably from 0.7 to 1.3%, by weight per total weight of the dye component.

The non-thickening viscosity modifier may be sodium sulfate.

Peroxide Stabilizing Agents

The oxidative component, and the hair colouring composition obtained thereof, may comprise at least one peroxide stabilizing agent.

The at least one peroxide stabilizing agent may be present in the hair colouring composition in an amount from 0.005 to 0.25%, preferably from 0.025 to 0.1%, of the peroxide stabilizing agent, by weight per total weight of the hair colouring composition.

The at least one peroxide stabilizing agent may be present in the oxidative component in an amount from 0.01 to 0.5%, preferably from 0.05 to 0.2%, by weight per total weight of the oxidative component.

The at least one peroxide stabilizing agent may be salicylic acid.

Additional Fatty Alcohol

The oxidative component, and the hair colouring composition, may comprise an additional fatty alcohol.

Additional Surfactants

The oxidative component, and the hair colouring composition, may comprise at least one additional surfactant (other than the anionic surfactant part of the gel network system). The additional surfactant is not part of the gel network.

The at least one additional surfactant may be present in the hair colouring composition in an amount from 0.35 to 0.85%, preferably from 0.45 to 0.75%, by weight of total weight of the hair colouring composition.

Prior mixing, the at least one additional surfactant may be present in the oxidative component in an amount from 0.7 to 1.7%, preferably from 0.9 to 1.5%, by weight per total weight of the oxidative component.

The at least one additional surfactant may be chosen from at least one additional anionic surfactants (other than the anionic surfactant part of the gel network system), at least one cationic surfactant, at least one nonionic surfactant, at least one amphoteric surfactant, at least one zwitterionic surfactant, and mixtures thereof.

The additional surfactant may be chosen from alkyl sulfates, polyoxyethylene ethers, preferably sodium cetearyl sulfate.

Other Ingredients

The hair colouring composition may comprise, in addition to the ingredients indicated above, other ingredients in order to further enhance the properties of the composition, as long as these are not excluded by the claims. The other ingredients, other than those described above, may be present in the hair colouring composition in an amount from 0.01 to 7%, by weight per total weight of the composition.

Prior mixing, the other ingredients may be present in the dye component and/or in the oxidative component.

The other ingredients may be chosen from fragrances, enzymes, dispersing agents, natural ingredients, ceramides, preserving agents, opacifiers and pearling agents, and mixtures thereof. Suitable further ingredients referred to above, but not specifically described below, are listed in the International Cosmetics Ingredient Dictionary and Handbook, (8th ed.; The Cosmetics, Toiletry, and Fragrance Association). Particularly, vol. 2, sections 3 (Chemical Classes) and 4 (Functions), which are useful in identifying specific adjuvants to achieve a particular purpose or multipurpose. A few of these ingredients are discussed hereinbelow, whose disclosure is of course non-exhaustive.

EXAMPLES

The following examples illustrate the method for treating freshly bleached hair according to the present disclosure. It is understood that the examples and embodiments described herein are for illustrative purposes only and that various modifications or changes in light thereof will be suggested to one skilled in the art without departing from the scope of the present disclosure.

1. Methods 1.1. Method for Treating Hair

In all examples, the first component A1 and the second component A2 are mixed together in 1:2 weight ratio to obtain the hair bleaching composition A.

The hair bleaching composition A is applied onto hair and left on hair for 30 minutes.

The freshly bleached hair is rinsed off using a conventional shampoo composition 2 times.

The dye component B1 and the oxidative component B2 are mixed together in 1:1 weight ratio to obtain the hair colouring composition B.

The hair colouring composition B is applied onto hair.

The hair colouring composition B is left for a determined period of time, for example about 5 min.

The hair colouring composition B is rinsed out using a conventional shampoo composition.

1.2. pH Measurement pH in the bowl: The pH is measured directly in the bowl, before applying the hair colouring composition onto hair.

pH on hair after 5 min: After the application of the hair colouring composition onto hair and a development time of 5 minutes, pH value was measured directly on head with a handheld Mettler Toledo Five Go (FG2) pH device pH Electrode Mettler Toledo LE 427.

2. Materials 2.1. Hair Samples

Unbleached human hair (control): Natural hair swatches (untreated, undamaged). Bleached human hair: A hair bleaching composition is prepared by mixing 1 part of Blondor Multiblond and 2 parts of Hydrogen Peroxide developer 9%. About 5 grams of the mixture is applied on about 0.6 gram of natural hair swatches (untreated). The hair bleaching composition is left of hair for about 30 minutes, before being rinsed off for 2 min with water (37° C.), then shampooed for 30 sec, then rinsed off again for 30 sec, then shampooed again for 30 sec, then rinsed off again for 30 sec, then dried. The flow speed of the water is controlled (4 L/min). Freshly bleached hair is obtained.

2.2. Formulations

It is provided the hair bleaching composition A, which is obtained by mixing at 1:2 weight ratio the first component A1 and the second component A2, as respectively shown in tables 1 and 2 below.

TABLE 1

| Materials | Component A1 |
| --- | --- |
| Potassium persulfate | q.s. 100 |
| Sodium silicate | 25 |
| Mineral oil | 4 |
| Ammonium persulfate | 5 |
| Xanthan gum | 4 |
| Disodium EDTA | 0.1 |
| Ultramarines (CI 77077) | 0.2 |

TABLE 2

| Materials | Component A2 |
| --- | --- |
| Hydrogen peroxide (50%) | 18 |
| Editronic acid | 0.01 |
| Disodium phosphate | 0.1 |
| Phosphoric acid | 0.1 |
| Water | q.s. 100 |

It is also provided the hair colouring compositions Ba-d, which are obtained by mixing in a 1:1 weight ratio the dye components B1a-d and the oxidative component B2, as respectively shown in tables 3 and 4 below.

TABLE 3

| Materials | B1a | B1b | B1c | B1d |
|---|---|---|---|---|
| Dicetyl phosphate, ceteth-10 phosphate | 0.65 | 0.65 | 0.65 | 0.65 |
| Cetearyl alcohol | 2.10 | 2.10 | 2.10 | 2.10 |
| Steareth-200 | 0.25 | 0.25 | 0.25 | 0.25 |
| Xantham gum | 0.15 | 0.15 | 0.15 | 0.15 |
| Propylene glycol | 8.00 | 8.00 | 8.00 | 8.00 |
| Mica and titanium dioxide | 0.50 | 0.50 | 0.50 | 0.50 |
| Citric acid | 0.2 | 0.2 | 0.2 | 0.2 |
| Sodium sulfate | 1.00 | 1.00 | 1.00 | 1.00 |
| Disodium EDTA | 0.10 | 0.10 | 0.10 | 0.10 |
| Ascorbic acid | 0.30 | 0.30 | 0.30 | 0.30 |
| Sodium sulfite | 0.40 | 0.40 | 0.40 | 0.40 |
| Sodium hydroxide | 1.10 | 1.10 | 1.10 | 1.10 |
| Trisodium ethylenediamine disuccinate (37%) | 3.40 | 3.40 | 3.40 | 3.40 |
| Fragrance | 0.30 | 0.30 | 0.30 | 0.30 |
| Monoethanolamine | 0.50 | 0.504 | 0.53 | 00.51 |
| 2-methoxymethyl-p-phenylenediamine | 0.125 | 0.110 | — | 0.040 |
| N,N-bis(2-hydroxyethyl)-p-phenylenediamine sulfate | — | — | 0.070 | 0.005 |
| Resorcinol | 0.022 | — | — | — |
| 2-methylresorcinol | 0.055 | 0.006 | — | — |
| m-aminophenol | 0.020 | 0.012 | — | — |
| Hydroxyethyl-3,4-methylenedioxyaniline HCL | — | 0.012 | — | 0.008 |
| 2,4-diaminophenoxyethanol HCl | — | — | — | 0.005 |
| 1-naphthol | — | — | — | 0.008 |
| 2-methyl-5-hydroxyethylaminophenol | — | 0.013 | 0.038 | 0.028 |
| Water | q.s. 100 | q.s. 100 | q.s. 100 | q.s. 100 |

TABLE 4

| Materials | B2 |
|---|---|
| Cetearyl alcohol | 2.00 |
| Sodium cetearyl sulfate | 0.80 |
| Mineral oil | 3.30 |
| Salicylic acid | 0.10 |
| Disodium phosphate | 0.35 |
| Phosphoric acid | 0.35 |
| Etidronic acid | 0.01 |
| Hydrogen peroxide (50%) | 4.00 |
| Acrylates/ceteth-20 itaconate copolymer | — |
| Water | Q.s. 100 |

The proportions in the tables 1-4 are by weight per total weight of each component. pH control of hair colouring compositions on hair The evolution of the pH is studied. Three assays were performed. The average results are shown in table 5 below.

TABLE 5

| Composition | pH of the mixture in the bowl | pH of the mixture on hair after 5 min | ΔpH of the mixture |
|---|---|---|---|
| Ba | 7.32 | 6.96 | 0.36 |
| Bb | 7.12 | 6.87 | 0.25 |
| Bc | 7.33 | 7.05 | 0.28 |
| Bd | 7.34 | 7.09 | 0.25 |

The data reported in table 5 show that freshly bleached hair treated with the hair colouring compositions Ba-d have a pH, which is (nearly) neutral i.e., within the range of from 6.8 to 7.2, only after a short development time (about 5 minutes).

pH Control of a Hair Colouring Composition on Bleached Hair Versus Unbleached Hair The evolution of the pH is comparatively studied between bleached hair (invention) and unbleached hair (comparative) using the hair colouring composition Bd. Three assays were performed (example Bd). The average results are shown in table 6 below.

TABLE 6

| Hair | pH of the mixture in the bowl | Average pH of hair before color treatment application | Average pH of the mixture on hair after 5 min | Average ΔpH of the mixture |
|---|---|---|---|---|
| Unbleached | 7.36 | 7.78 | 7.10 | 0.26 |
| Bleached | 7.34 | 8.39 | 7.09 | 0.25 |

The data reported in table 6 show that the pH on hair after 5 min is not significantly different between the unbleached hair (comparative) and the bleached hair (inventive), considering that the pH drops by least 0.20 unit to the range from 6.8 to 7.2 in both cases. This is an unexpected result, as freshly bleached have a higher alkaline pH than unbleached hair, and it would have been expected that, after treatment, its pH would therefore be higher than unbleached hair.

Clauses

Clause 1: A method for treating hair comprising the steps of:
bleaching hair;
applying a hair colouring composition onto hair, wherein the hair colouring composition has a pH from 7.0 to 8.0, preferably a pH of more than 7.2 up to 8.0, more preferably from 7.3 to 8.0, and comprises a buffering system;
leaving the hair colouring composition for 10 minutes or less on hair, wherein the composition has a pH which over development time on hair drops by at least 0.20 unit to the range from 6.8 to 7.2; and
rinsing out the hair colouring composition.

Clause 2: The method for treating hair, according to clause 1, wherein the hair colouring composition is left on hair from 2 to 8 minutes, preferably from 3 to 7 minutes, more preferably from 4 to 6 minutes, most preferably for about 5 minutes.

Clause 3: The method for treating hair, according to any preceding clauses, wherein the hair is immediately bleached, preferably 48 h or less, preferably 24 h or less, more preferably 3 h or less, before applying the hair colouring composition.

Clause 4: The method for treating hair, according to any preceding clauses, wherein the hair colouring composition comprises at least one alkalizing agent, at least one oxidizing agent, at least one chelant, at least a first buffering acidic compound, at least a second buffering acidic compound, at least one buffering alkali compound, a gel network thickener system, at least one oxidative hair dye precursor and at least one coupler, and at least one solvent;
wherein the gel network thickener system comprises at least one anionic surfactant, at least one fatty alcohol and at least one non-ionic surfactant.

Clause 5: The method for treating hair, according to any preceding clauses, wherein, before applying the hair colouring composition onto hair, the method comprises the step of preparing the hair colouring composition by mixing a dye component and an oxidative component;
   wherein the dye component has a pH from 8.5 to 10, preferably from 9 to 10; and
   wherein the oxidative component has a pH from 1.8 to 3.5, preferably from 2 to 3.

Clause 6: The method for treating hair, according to clause 5, wherein the dye component and the oxidative component are mixed in a weight ratio from 3:1 to 1:3, preferably from 2:1 to 1:2, more preferably of about 1:1.

Clause 7: The method for treating hair, according to clauses 5-6, wherein the dye component comprises at least one alkalizing agent, at least one chelant, at least one first buffering acidic compound, at least one anionic surfactant, at least one fatty alcohol, at least one non-ionic surfactant, at least one oxidative hair dye precursor and at least one coupler, and at least one solvent.

Clause 8: The method for treating hair, according to clauses 5-7, wherein the oxidative component comprises at least one oxidizing agent, at least one second buffering acidic compound, at least one buffering alkali compound, and at least one solvent.

Clause 9: The method for treating hair, according to clauses 5-8, wherein the first buffering acidic compound is citric acid, the second buffering acidic compound is phosphoric acid and the buffering alkali compound is disodium phosphate.

Clause 10: The method for treating hair, according to any preceding clauses, wherein, after rinsing out the hair colouring composition, the method further comprises the step of drying hair, combing or brushing hair, and/or applying a conditioning composition onto hair.

Clause 11: Composition for treating bleached hair, wherein the composition has a pH which over development time on hair drops by at least 0.20 unit to the range from 6.8 to 7.2;
   wherein the hair colouring composition comprises at least one alkalizing agent, at least one oxidizing agent, at least one chelant, at least a first buffering acidic compound, at least a second buffering acidic compound, at least one buffering alkali compound, a gel network thickener system, at least one oxidative hair dye precursor and at least one coupler, at least one solvent;
   wherein the gel network thickener system comprises at least one anionic surfactant, at least one fatty alcohol and at least one non-ionic surfactant;
   wherein, the hair colouring composition onto hair is prepared by mixing a dye component and an oxidative component;
   wherein the dye component has a pH from 8.5 to 10, preferably from 9 to 10; and
   wherein the oxidative component has a pH from 1.8 to 3.5, preferably from 2 to 3.

Clause 12: Use of the composition according to clause 11, for treating bleached hair.

The invention claimed is:

1. A method for treating hair comprising the steps of:
   bleaching hair, wherein the hair is bleached 48 h or less before applying a hair colouring composition;
   applying the hair colouring composition onto hair, wherein the hair colouring composition has a pH from 7.0 to 8.0, and comprises a buffering system;
   leaving the hair colouring composition for 10 minutes or less on hair, wherein the composition has a pH which over development time on hair drops by at least 0.20 unit to the range from 6.8 to 7.2; and
   rinsing out the hair colouring composition.

2. The method for treating hair, according to claim 1, wherein the hair colouring composition is left on hair from 2 to 8 minutes.

3. The method for treating hair, according claim 1, wherein the hair is immediately bleached 24 h or less, before applying the hair colouring composition.

4. The method for treating hair, according to claim 1, wherein the hair colouring composition comprises at least one alkalizing agent, at least one oxidizing agent, at least one chelant, at least a first buffering acidic compound, at least a second buffering acidic compound, at least one buffering alkali compound, a gel network thickener system, at least one oxidative hair dye precursor and at least one coupler, and at least one solvent; wherein the gel network thickener system comprises at least one anionic surfactant, at least one fatty alcohol and at least one non-ionic surfactant.

5. The method for treating hair, according to claim 1, wherein, before applying the hair colouring composition onto hair, the method comprises the step of preparing the hair colouring composition by mixing a dye component and an oxidative component; wherein the dye component has a pH from 8.5 to 10; and wherein the oxidative component has a pH from 1.8 to 3.5.

6. The method for treating hair, according to claim 5, wherein the dye component and the oxidative component are mixed in a weight ratio from 3:1 to 1:3.

7. The method for treating hair, according to claim 5, wherein the dye component comprises at least one alkalizing agent, at least one chelant, at least one first buffering acidic compound, at least one anionic surfactant, at least one fatty alcohol, at least one non-ionic surfactant, at least one oxidative hair dye precursor and at least one coupler, and at least one solvent.

8. The method for treating hair, according to claim 5, wherein the oxidative component comprises at least one oxidizing agent, at least one second buffering acidic compound, at least one buffering alkali compound, and at least one solvent.

9. The method for treating hair, according to claim 4, wherein the first buffering acidic compound is citric acid, the second buffering acidic compound is phosphoric acid and the buffering alkali compound is disodium phosphate.

10. The method for treating hair, according to claim 1, wherein, after rinsing out the hair colouring composition, the method further comprises the step of drying hair, or combing hair, or brushing hair, or applying a conditioning composition onto hair or any combination thereof.

11. The method for treating hair, according to claim 1, wherein the hair colouring composition has a pH of more than 7.2 up to 8.0.

12. The method for treating hair, according to claim 1, wherein the hair colouring composition has a pH from 7.3 to 8.0.

13. The method for treating hair, according to claim 1, wherein the hair colouring composition is left on hair from 3 to 7 minutes.

14. The method for treating hair, according to claim 1, wherein the hair colouring composition is left on hair from 4 to 6 minutes.

15. The method for treating hair, according to claim 1, wherein the hair colouring composition is left on hair for about 5 minutes.

16. The method for treating hair, according to claim 1, wherein the hair is immediately bleached 3 h or less, before applying the hair colouring composition.

17. The method for treating hair, according to claim 5, wherein the dye component has a pH from 9 to 10; and wherein the oxidative component has a pH from 2 to 3.

18. The method for treating hair, according to claim 5, wherein the dye component and the oxidative component are mixed in a weight ratio from 2:1 to 1:2.

19. The method for treating hair, according to claim 5, wherein the dye component and the oxidative component are mixed in a weight ratio of about 1:1.

* * * * *